United States Patent
Li et al.

(10) Patent No.: US 12,111,672 B2
(45) Date of Patent: Oct. 8, 2024

(54) DEHUMIDIFIER

(71) Applicants: GD MIDEA AIR-CONDITIONING EQUIPMENT CO., LTD., Foshan (CN); MIDEA GROUP CO., LTD., Foshan (CN)

(72) Inventors: Weiming Li, Foshan (CN); Zhiming Zhang, Foshan (CN)

(73) Assignees: GD MIDEA AIR-CONDITIONING EQUIPMENT CO., LTD., Foshan (CN); MIDEA GROUP CO., LTD., Foshan (CN)

( * ) Notice: Subject to any disclaimer, the term of this patent is extended or adjusted under 35 U.S.C. 154(b) by 344 days.

(21) Appl. No.: 17/617,676

(22) PCT Filed: Oct. 25, 2019

(86) PCT No.: PCT/CN2019/113205
§ 371 (c)(1),
(2) Date: Dec. 9, 2021

(87) PCT Pub. No.: WO2020/258618
PCT Pub. Date: Dec. 30, 2020

(65) Prior Publication Data
US 2022/0236750 A1     Jul. 28, 2022

(30) Foreign Application Priority Data

Jun. 25, 2019  (CN) .......................... 201910558093.2
Jun. 25, 2019  (CN) .......................... 201920967950.X

(51) Int. Cl.
*F24F 13/22*      (2006.01)
*G05D 9/12*       (2006.01)

(52) U.S. Cl.
CPC ............. *G05D 9/12* (2013.01); *F24F 13/222* (2013.01)

(58) Field of Classification Search
CPC .... F24F 13/222; F24F 13/22; F24F 2013/227; F24F 2203/02; F24F 2203/021; F24F 1/0358; F24F 1/02; G05D 9/12
See application file for complete search history.

(56) References Cited

U.S. PATENT DOCUMENTS 5,156,048 A  * 10/1992  DeFigueiredo ......... G01F 23/74
                                                 222/DIG. 1
6,415,618 B1    7/2002  Sul et al.
(Continued)

FOREIGN PATENT DOCUMENTS

CN       1979026 A    6/2007
CN     101839541 A    9/2010
(Continued)

OTHER PUBLICATIONS

Butterfield, A., & Szymanski, J. (2018). magnetometer. In A Dictionary of Electronics and Electrical Engineering. : Oxford University Press. Retrieved Jan. 12, 2024, from https://www.oxfordreference.com/view/10.1093/acref/9780198725725.001.0001/acref-9780198725725-e-2842. (Year: 2018).*

(Continued)

*Primary Examiner* — Miguel A Diaz
(74) *Attorney, Agent, or Firm* — Anova Law Group, PLLC

(57) ABSTRACT

A dehumidifier includes a housing, a water tank mounted in the housing, a detection device, and a controller electrically coupled to the detection device. The detection device includes a detector arranged at the housing and a signal trigger arranged in the water tank. The signal trigger is configured to move to a detection area of the detector in response to a water level in the water tank being higher than a preset position, and move out of the detection area of the detector in response to the water level in the water tank being lower than the preset position. The controller is (Continued)

configured to control a pump to stop pumping water in response to the signal trigger being located outside the detection area of the detector.

17 Claims, 9 Drawing Sheets

(56) References Cited

U.S. PATENT DOCUMENTS

| | | | | |
|---|---|---|---|---|
| 2015/0276241 A1* | 10/2015 | Jeon | ...................... | F24F 3/1405 |
| | | | | 62/126 |
| 2015/0276242 A1* | 10/2015 | Yoon | ...................... | F24F 1/0323 |
| | | | | 62/291 |
| 2016/0153824 A1* | 6/2016 | Myeong | .................. | G01F 23/72 |
| | | | | 73/306 |

FOREIGN PATENT DOCUMENTS

| | | |
|---|---|---|
| CN | 201637000 U | 11/2010 |
| CN | 102116520 A | 7/2011 |
| CN | 103047715 A | 4/2013 |
| CN | 203456376 U | 2/2014 |
| CN | 104949214 A | 9/2015 |
| CN | 105466516 A | 4/2016 |
| CN | 106441514 A | 2/2017 |
| CN | 110145818 A | 8/2019 |
| CN | 210128458 U | 3/2020 |
| FR | 2934673 B3 | 2/2010 |

OTHER PUBLICATIONS

Butterfield, A., & Szymanski, J. (2018). Hall effect. In A Dictionary of Electronics and Electrical Engineering. : Oxford University Press. Retrieved Jan. 12, 2024, from https://www.oxfordreference.com/view/10.1093/acref/9780198725725.001.0001/acref-9780198725725-e-2052. (Year: 2018).*
World Intellectual Property Organization (WIPO) International Search Report and Written Opinion for PCT/CN2019/113205 Feb. 28, 2020 16 pages (with translation).
China National Intellectual Property Administration (CNIPA) The First Office Action for Application No. 201910558093.2 Dec. 8, 2023 11 Pages (including translation).

* cited by examiner

DEHUMIDIFIER

CROSS-REFERENCE TO RELATED APPLICATIONS

This application is a National Stage Entry under 35 U.S.C. § 371 of International Application No. PCT/CN2019/113205, filed on Oct. 25, 2019, which claims priority to Chinese patent application Nos. 201910558093.2 and 201920967950.X, both filed on Jun. 25, 2019, and both entitled "DEHUMIDIFIER." The entire contents of the aforementioned applications are incorporated herein by reference.

This application claims priority to Chinese patent application Nos. 201910558093.2 and 201920967950.X, both filed on Jun. 25, 2019, and both entitled "DEHUMIDIFIER." The entire contents of the aforementioned applications are incorporated herein by reference.

TECHNICAL FIELD

The present application relates to the technical field of air treatment, in particular to a dehumidifier.

BACKGROUND

With a continuous improvement of living standards, people's requirements for quality of life are getting higher and higher, and there are certain requirements for air humidity. Dehumidifiers are usually used to reduce air humidity. Dehumidifiers are usually equipped with a water tank for collecting water, and water in the water tank is pumped out by a pump. Because an overly low water level in the water tank will cause a failure of the pump to pump water, it is needed to monitor the water level in the water tank to prevent the water level in the water tank from being too low. However, a mechanical micro switch cannot be used for low water level sensing due to structural limitations, so the existing dehumidifiers generally control the pumping time of the pump to prevent the water level in the water tank from being too low, but the inaccurate pumping amount each time will lead to a relatively large amount of accumulated water in the water tank.

SUMMARY

The main purpose of the present application is to provide a dehumidifier, which can accurately sense a low water level in the water tank and avoid a failure of pumping water caused by the low water level in the water tank.

To achieve the above purpose, the present application provides a dehumidifier including:

a housing;

a water tank mounted in the housing;

a detection device including a detector and a signal trigger, the detector is arranged at the housing, the signal trigger is arranged in the water tank, and when a water level in the water tank is higher than a preset position, the signal trigger moves to the detection area of the detector, and when the water level in the water tank is lower than the preset position, the signal trigger moves out of the detection area of the detector; and a controller electrically coupled to the detection device and configured to control a pump to stop pumping water when the signal trigger is located outside the detection area of the detector.

Optionally, the detector is a Hall sensor and the signal trigger is a float with magnetism.

Optionally, the housing is provided with a partition plate, the partition plate and the housing together form a mounting groove, the water tank is mounted in the mounting groove, and the detector is mounted at the partition plate.

Optionally, a lower end of the partition plate protrudes toward the water tank to form a limiting groove, and the detector is mounted in the limiting groove.

Optionally, a bottom of the limiting groove is provided with a heat dissipation through hole.

Optionally, an opening of the limiting groove is provided with a limiting buckle clamping a surface of the detector.

Optionally, a number of the limiting buckle is two, and the two limiting buckles are respectively arranged at opposite sides of the limiting groove.

Optionally, the dehumidifier further includes a compressor, and the housing is divided by the partition plate into two chambers, one of which forming the mounting groove and the other of which mounting the compressor.

Optionally, the water tank is a drawer-type water tank.

Optionally, a limiting chamber extending in a vertical direction is formed at a side wall of the water tank, a communication port communicating with the water tank is formed at a bottom of the limiting chamber, and the signal trigger is arranged in the limiting chamber and capable of moving up and down.

Optionally, the limiting chamber is integrally formed at the side wall of the water tank; or, the limiting chamber is detachably mounted at the side wall of the water tank.

Optionally, a top of the limiting chamber is provided with a limiting plate configured to stop the signal trigger.

Optionally, the limiting plate is provided with a buckling groove, and the side wall of the water tank is provided with a limiting buckle adapted to the buckling groove.

Optionally, a fixation member is provided at the bottom of the limiting chamber, and a fixation hole is provided at the fixation member; a support base for supporting the fixation member is arranged at the water tank, and a fixation post adapted to the fixation hole is arranged at the supporting base.

Optionally, a top of the signal trigger is provided with a limiting block configured to abut against a top of the limiting chamber.

Optionally, a rib is provided at a periphery of the signal trigger.

Optionally, an interior of the signal trigger is hollow, and a bottom of the signal trigger is provided with a water inlet hole.

The dehumidifier of the present application includes a housing, a water tank, a detection device and a controller. The water tank is mounted in the housing. The detection device includes a detector and a signal trigger, the detector is arranged at the housing, the signal trigger is arranged in the water tank, when a water level in the water tank is higher than a preset position, the signal trigger moves to the detection area of the detector. When the water level in the water tank is lower than the preset position, the signal trigger moves out of the detection area of the detector. The controller is electrically coupled to the detection device to control the pump to stop pumping water when the signal trigger is located outside the detection area of the detector. Therefore, when the dehumidifier of the present application adopts a water pump to pump water from the water tank, when the water level in the water tank is lower than the preset position, the signal trigger moves outside the detection area of the detector, so that the detection device can accurately sense the low water level in the water tank, and accurately determine the low water level in the water tank, and avoids the water pumping fault caused by the low water level in the water tank.

BRIEF DESCRIPTION OF THE DRAWINGS

In order to more clearly explain the embodiments of the present application or the technical solutions in the related art, the drawings required for the description of embodiments or related art will be briefly described below. It will be apparent that the drawings described below are only some embodiments of the present application, and other drawings may be obtained from the structure shown in these drawings without any creative effort by those of ordinary skill in the art.

DESCRIPTION OF DRAWING NUMBER

Figure 1:
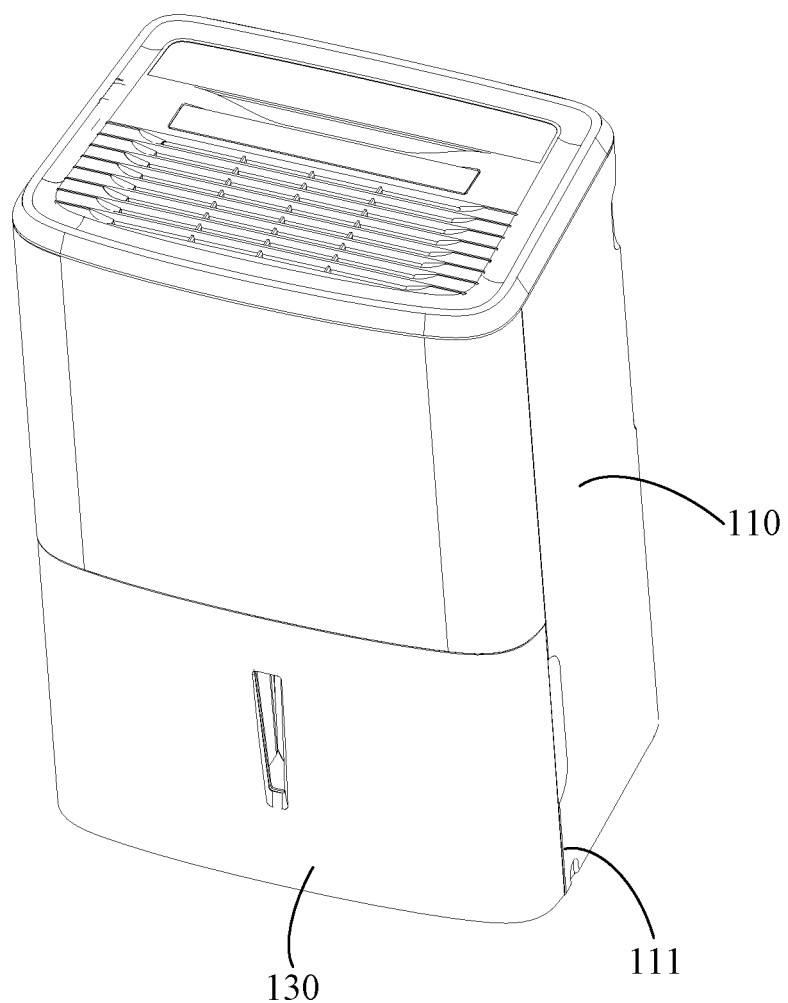
FIG. 1 is a schematic structural diagram of a dehumidifier of an embodiment of the present application.
Figure 2:
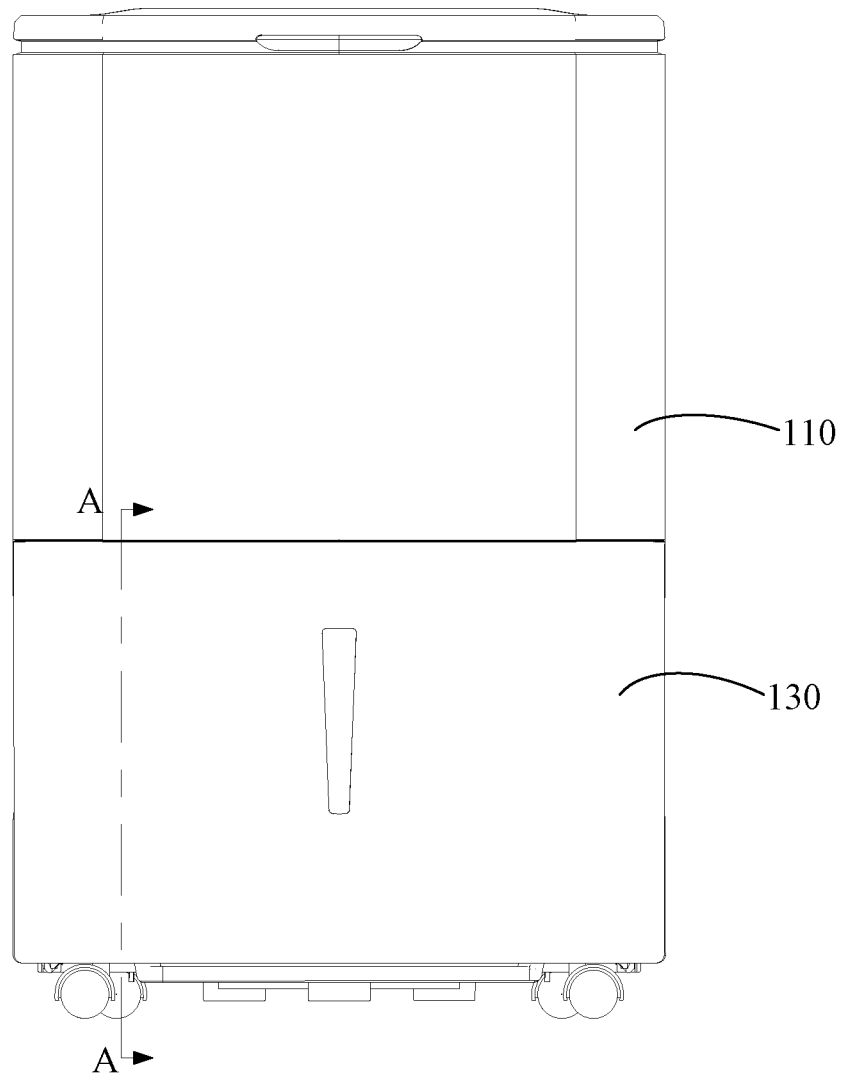
FIG. 2 is a front view of a dehumidifier of an embodiment of the present application.

| Reference Numeral | Name | Reference Numeral | Name |
| --- | --- | --- | --- |
| 100 | dehumidifier | 140 | Limiting chamber |
| 110 | Housing | 141 | Communication port |
| 111 | Mounting groove | 142 | Limiting plate |
| 120 | Partition plate | 143 | Buckling groove |
| 121 | Limiting groove | 150 | Detection device |
| 122 | Heat dissipation through hole | 151 | Detector |
| 123 | limiting buckle | 152 | signal trigger |
| 130 | Water tank | 153 | Limiting block |
| 131 | Fixation member | 154 | Rib |
| 132 | Support base | 155 | Water inlet hole |
| 133 | Fixation post | 160 | Compressor |
| 134 | limiting buckle | | |

The realization of the purpose, functional features and advantages of the present application will be further explained with reference to the accompanying drawings in connection with the embodiments.

DETAILED DESCRIPTION OF THE EMBODIMENTS

It should be noted that if there is a directivity indication (such as up, down, left, right, front, back, etc.) in the embodiment of the present application, the directivity indication is only used to explain the relative positional relationship and motion among the components under a specific posture (according to the drawing), and if the specific posture changes, the directivity indication will change accordingly. In addition, the meaning of "and/or" in the whole text is to include three parallel schemes, taking "A and/or B" as an example, including scheme A, or scheme B, or both schemes A and B.

The present application provides a dehumidifier. Usually, dehumidifiers can reduce humidity in ambient air. In the embodiment of the present application, the dehumidifier may also accurately sense a low water level in the water tank, thus avoiding the water pumping failure caused by a too low water level in the water tank.

Referring to FIGS. 1 to 5, the present application provides a dehumidifier 100 including a housing 110, a water tank 130, a detection device 150, and a controller. The water tank 130 is mounted in the housing 110. The detection device 150 includes the detector 151 and a signal trigger 152. The detector 151 is arranged at the housing 110 and the signal trigger 152 is arranged in the water tank 130. When a water level in the water tank 130 is higher than a preset position, the signal trigger 152 moves to a detection area of the detector 151. When the water level in the water tank 130 is lower than the preset position, the signal trigger 152 moves out of the detection area of the detector 151. A controller is electrically coupled to the detection device 150 to control a pump to stop pumping water when the signal trigger 152 is located outside the detection area of the detector 151.

In embodiments of the present application, the dehumidifier 100 specifically relates to a mobile dehumidifier 100 but of course is not limited thereto. The dehumidifier 100 includes a fan assembly, a compressor 160, a condenser, an evaporator and the like arranged in the housing 110. The housing 110 is provided with an air inlet and an air outlet. The fan assembly is configured to drive air into the housing 110 from the air inlet, and then blows out from the air outlet after acting with the condenser and the evaporator in the housing 110. Specifically, a working principle of the dehumidifier 100 is: after a refrigerant is compressed by the compressor 160, the refrigerant with high temperature and high pressure is formed and flows to the condenser, the refrigerant with high temperature and high pressure cools down via the condenser and becomes a liquid with low temperature and high pressure. Then the refrigerant is changed into low-temperature and low-pressure liquid through a throttling device, and then the refrigerant flows to the evaporator. The low-temperature and low-pressure liquid refrigerant transfers heat with the air via the evaporator, and the refrigerant absorbs heat to condense the air. The refrigerant is converted from liquid to low-pressure gas and flows to the compressor 160 again.

Figure 3:
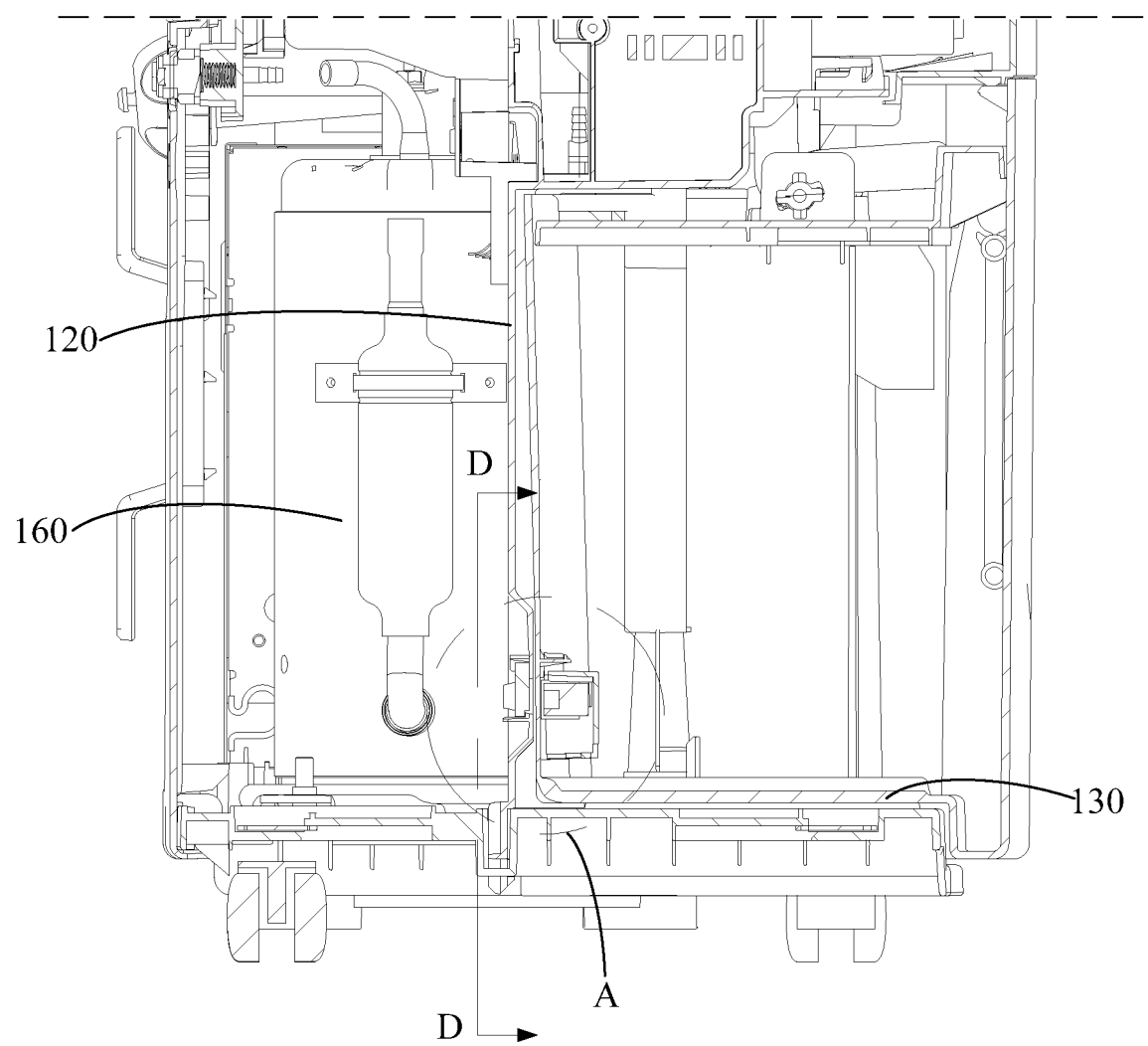
FIG. 3 is a sectional view along the A-A direction of FIG. 2.

The water tank 130 may be integrally arranged at the housing 110 or, of course, the water tank 130 may be detachably mounted at the housing 110. In one embodiment, a partition plate 120 is arranged in the housing 110, and the partition plate 120 and the housing 110 together form a mounting groove 111, and the water tank 130 is mounted in the mounting groove 111. Specifically, the partition plate 120 divides the housing 110 into front and rear two chambers, one of which (the mounting groove 111) is mounted with the water tank 130 and the other is mounted with the compressor 160 (as shown in FIG. 3). In this embodiment the water tank 130 is a drawer-type water tank 130 for collecting condensed water generated in the dehumidifier 100. When the water level in the water tank 130 is high, the water in the water tank 130 can be pumped out by a water pump.

In the embodiment of the present application, by providing the detection device 150, the detection device 150 can accurately sense the low water level in the water tank 130, thereby accurately determining that the water level in the water tank 130 is low. Specifically, the detection device 150 includes a detector 151 mounted at the partition plate 120 and a signal trigger 152 arranged in the water tank 130, and the signal trigger 152 can move up and down in the water tank 130. When the water level in the water tank 130 is higher than the preset position, the signal trigger 152 moves to the detection area of the detector 151. When the water level in the water tank 130 is lower than the preset position, the signal trigger 152 moves out of the detection area of the detector 151. In particular, the preset position corresponds to a position where the water level in the water tank 130 is low, and the preset position can be selected according to actual needs without being specifically limited. There may be a variety of configurations and types of the detector 151, for example the detector 151 may be a Hall sensor, a photoelectric sensor, a proximity sensor or the like which is not limited thereto.

The controller is electrically coupled to the detection device 150 to control the pump to stop pumping water when the signal trigger 152 is located outside the detection area of the detector 151. That is, when the water tank 130 is pumped by a water pump, if the signal trigger 152 is located in the detection area of the detector 151, it means that the water level in the water tank 130 is high at this time, and the water pump can be controlled to continue pumping. If the signal trigger 152 is located outside the detection area of the detector 151, it means that the water level in the water tank 130 is low at this time, and if the pump continues to pump water, a failure of the pump will occur, so the pump can be controlled to stop pumping water.

The dehumidifier 100 of the present application includes a housing 110, a water tank 130, a detection device 150 and a controller. The water tank 130 is mounted in the housing 110. The detection device 150 includes a detector 151 arranged at the housing 110 and a signal trigger 152 arranged in the water tank 130. When the water level in the water tank 130 is higher than a preset position, the signal trigger 152 moves to a detection area of the detector 151. When the water level in the water tank 130 is lower than the preset position, the signal trigger 152 moves out of the detection area of the detector 151. The controller is electrically coupled to the detection device 150 to control the pump to stop pumping water when the signal trigger 152 is located outside the detection area of the detector 151. Therefore, when the dehumidifier 100 of the present application uses a water pump to pump water from the water tank 130, and the water level in the water tank 130 is lower than a preset position, the signal trigger 152 moves outside the detection area of the detector 151, so that the detector 150 can accurately sense the low water level in the water tank 130, and can accurately determine that the water level in the water tank 130 is low, thus avoiding a water pumping failure caused by the low water level in the water tank 130.

Figure 5:
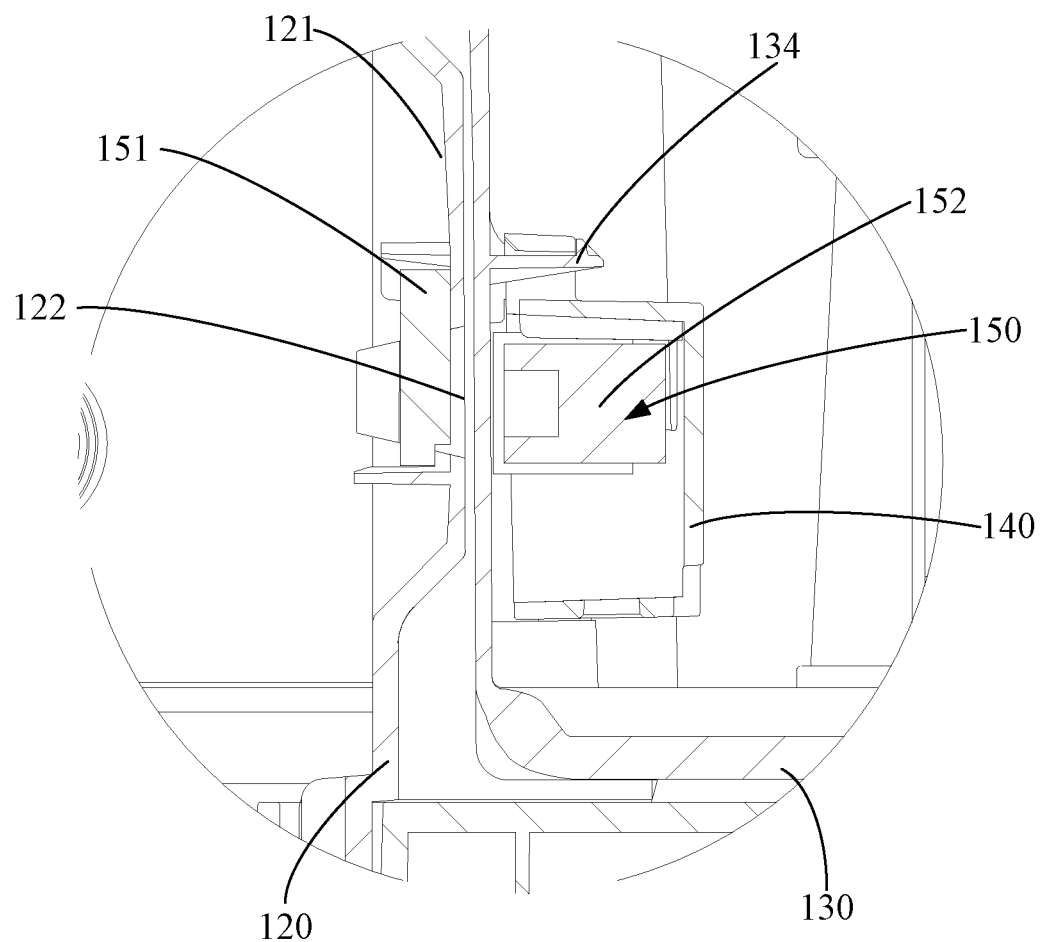
FIG. 5 is an enlarged view of portion A of FIG. 3.

Referring to FIGS. 3 and 5, in one embodiment, the detector 151 is a Hall sensor and the signal trigger 152 is a float with magnetism.

In this embodiment, when the water level in the water tank 130 is higher than the preset position, the float is located just in the sensing direction of the Hall sensor, and the Hall sensor can sense the magnetic field of the float. At this time, the Hall sensor sends a signal that the water level in the water tank 130 is higher to the controller. When the water level in the water tank 130 is lower than the preset position, the float is outside of the sensing range of the Hall sensor, and the Hall sensor cannot sense the magnetic field of the float. At this time, the Hall sensor sends a signal that the water level in the water tank 130 is low to the controller.

There are various ways to arrange the detector 151 in the partition plate 120. For example, in one embodiment, in order to prevent the detector 151 from protruding from the partition plate 120, a limiting groove 121 can be provided at the partition plate 120 to accommodate the detector 151. Specifically, referring to FIG. 5, a lower end of the partition plate 120 protrudes toward the water tank 130 to form a limiting groove 121, and the detector 151 is mounted in the limiting groove 121.

Considering that the detector 151 generates heat during operation, a heat dissipation through hole 122 can be provided at a bottom of the limiting groove 121 in order to dissipate heat from the detector 151 and ensure the normal operation of the detector 151.

It is worth mentioning that the heat dissipation through hole 122 is provided at the bottom of the limiting groove 121, which can dissipate heat from the detector 151 on the one hand, and reduce a barrier between the detector 151 and the signal trigger 152 on the other hand, thereby improving the detection sensitivity of the detection device 150.

Figure 4:
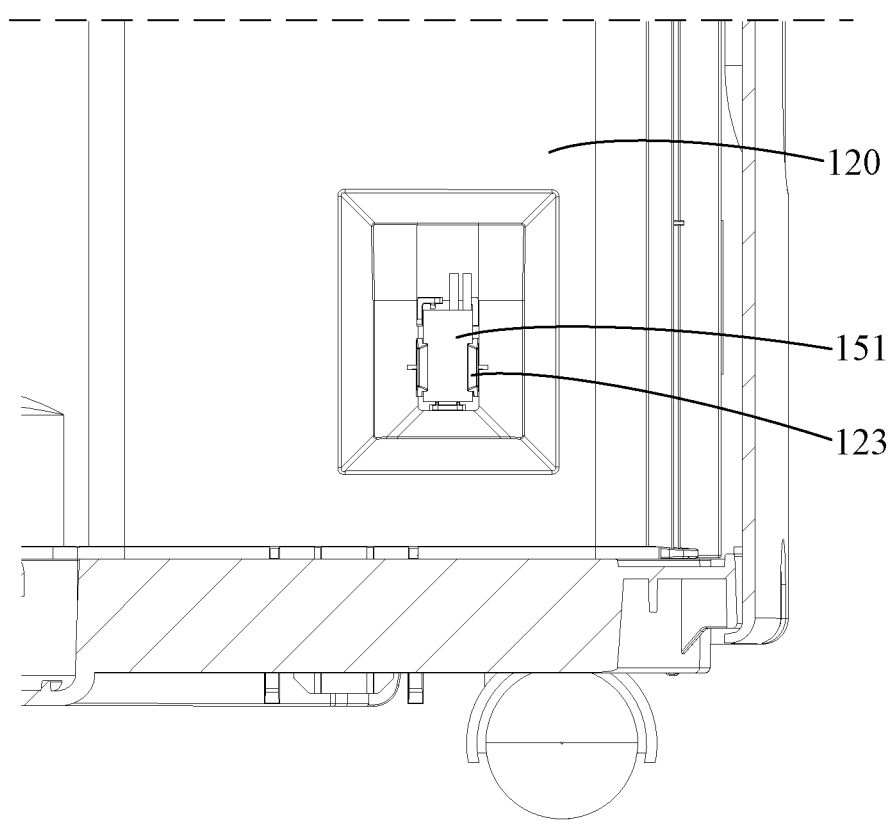
FIG. 4 is a sectional view along the D-D direction of FIG. 3.

Further, referring to FIG. 4, in order to facilitate the mounting and removal of the detector 151, an opening of the limiting groove 121 is provided with a limiting buckle 123, and the limiting buckle 123 clamps a surface of the detector 151. A number and a position of the limiting buckle 123 are not limited. For example, in one embodiment, the number of the limiting buckle 123 is two, and the two limiting buckles 123 are respectively arranged at opposite sides of the limiting groove 121, so that the mounting of the detector 151 is more stable and the detection accuracy of the detection device 150 is improved.

Figure 6:
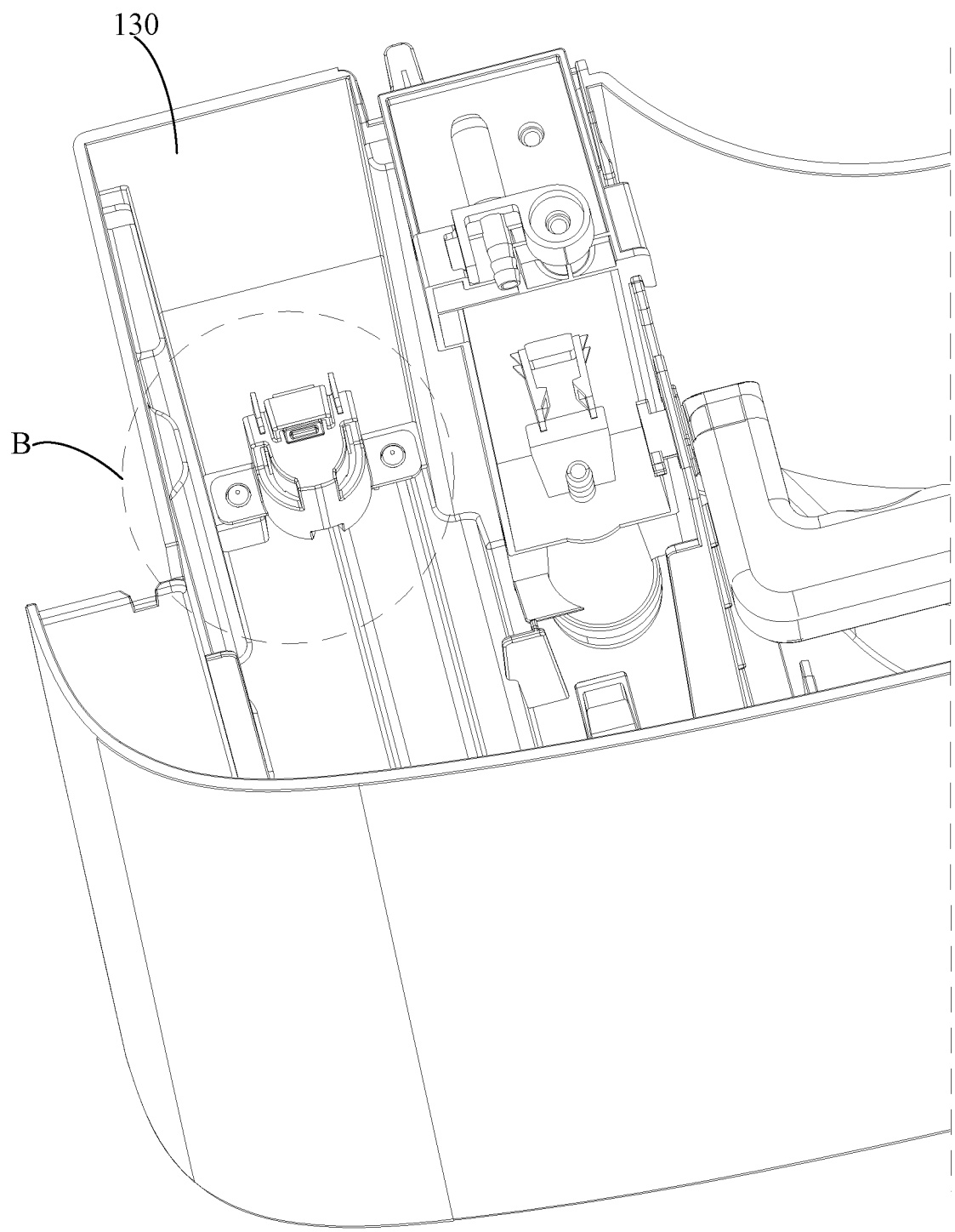
FIG. 6 is a partial structural diagram of a dehumidifier of an embodiment of the present application.
Figure 7:
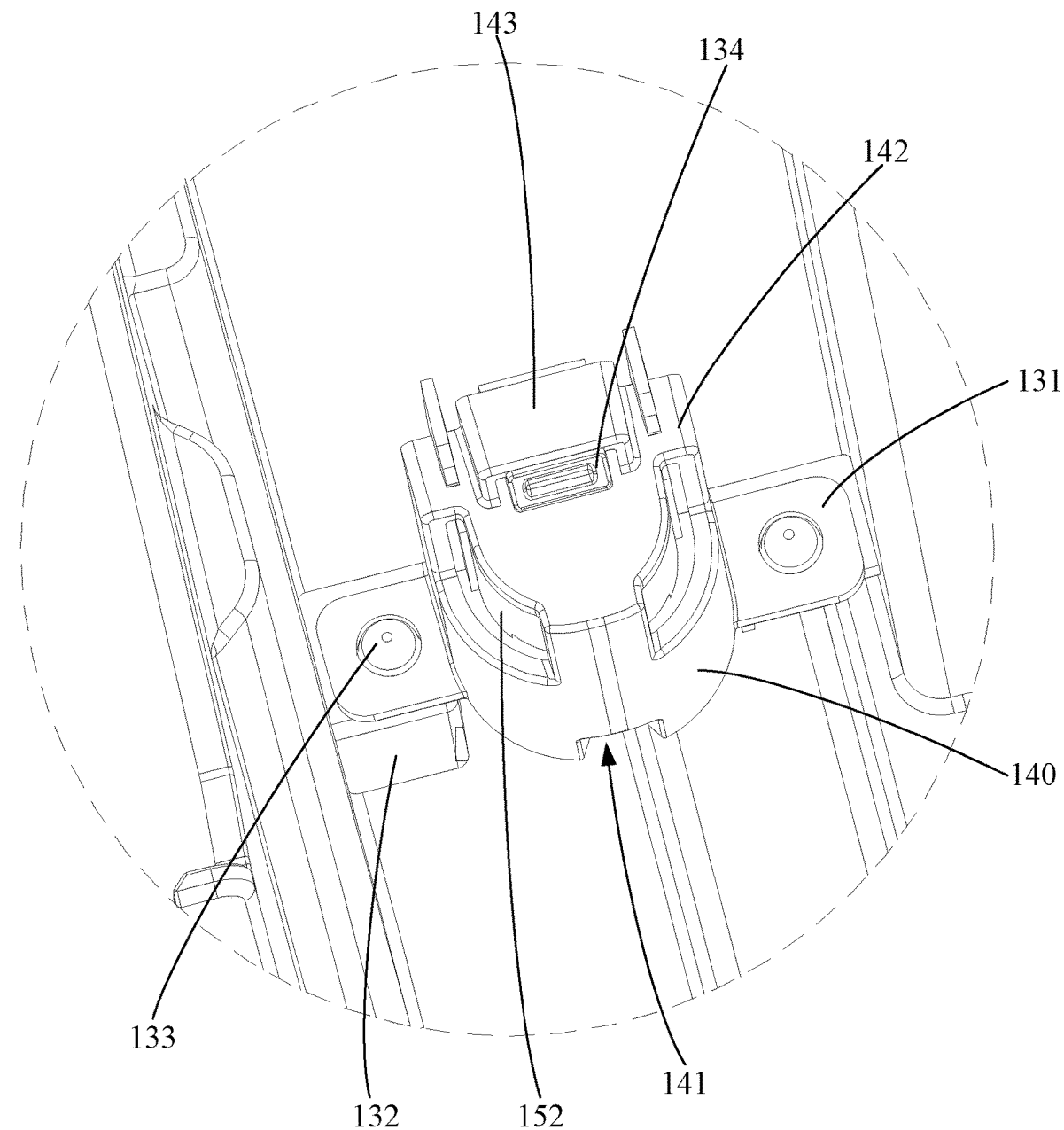
FIG. 7 is an enlarged view of portion B of FIG. 6.
Figure 8:
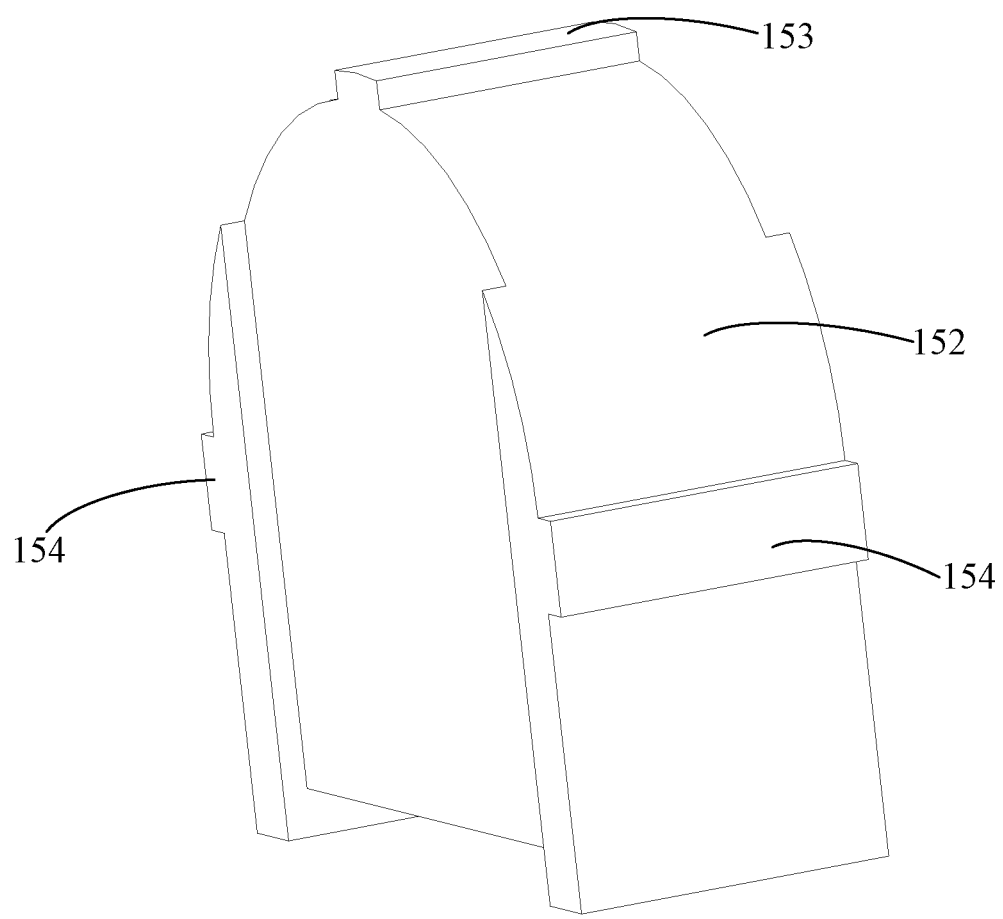
FIG. 8 is a schematic structural diagram of a signal trigger of the dehumidifier of the present application.
Figure 9:
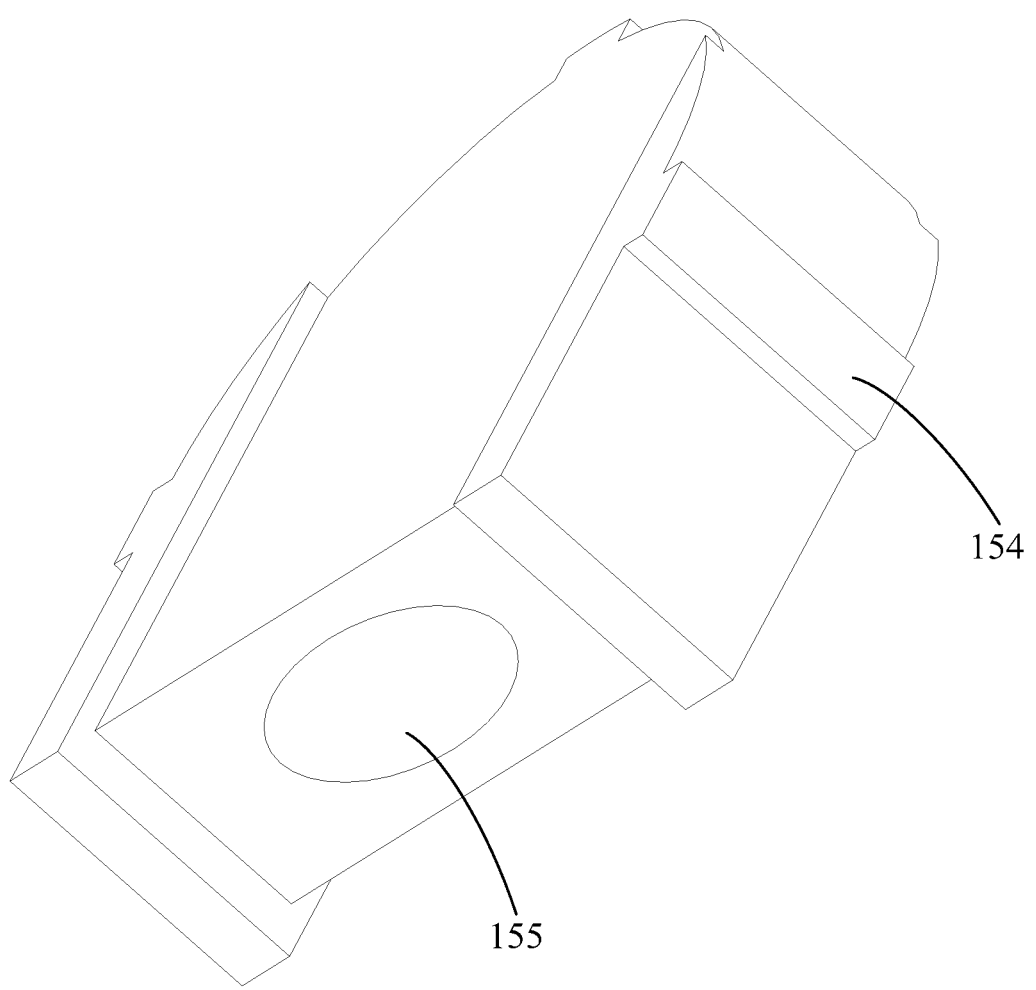
FIG. 9 is a schematic structural diagram of the signal trigger of FIG. 8 from another perspective.

Referring to FIGS. 5 to 7, a limiting chamber 140 extending in a vertical direction is provided at a side wall of the water tank 130, a communication port 141 is provided at a bottom of the limiting chamber 140 to communicate with the water tank 130, and the signal trigger 152 is provided in the limiting chamber 140 and can move up and down.

It should be noted that, when the water level in the water tank 130 is higher than the preset position, the water in the water tank 130 flows into the limiting chamber 140 from the communication port 141. The signal trigger 152 (the magnetic float) moves to the detection area of the detector 151 under an action of buoyancy. At this time, the detector 151 can sense the signal trigger 152 and send a signal that the water level in the water tank 130 is higher to the controller, the controller can control the pump to continue pumping water. When the water level in the water tank 130 is lower than the preset position, the water in the limiting chamber 140 flows back to the water tank 130 from the communication port 141, as the water level in the limiting chamber 140 drops, the buoyancy of the signal trigger 152 (the magnetic float) is reduced and the signal trigger 152 moves out of the detection area of the detector 151, the detector 151 is unable to sense the signal trigger 152, and therefore sends a signal that the water level in the water tank 130 is low to the controller, and the controller can control the pump to stop pumping water. The side wall of the water tank 130 refers to a side wall of the water tank 130 close to the partition plate 120.

Furthermore, in order to ensure that the signal trigger 152 moves exactly to the detection area of the detector 151 when the water level in the water tank 130 is higher than the preset position, a limiting plate 142 can be arranged at the top of the limiting chamber 140, and the limiting plate 142 is configured to stop the signal trigger 152.

It should be understood that, when the water level in the water tank 130 is higher than the preset position, the water in the water tank 130 flows into the limiting chamber 140 from the communication port 141, and the signal trigger 152 (the magnetic float) floats upward under an action of buoyancy, and stops when the signal trigger 152 floats upward to contact with the limiting plate 142, at this time the signal trigger 152 is located just in the detection area of the detector 151 (as shown in FIG. 5).

On the basis of the above-described embodiments, the limiting chamber 140 may be integrally formed at the side wall of the water tank 130, or of course, the limiting chamber 140 may be detachably mounted at the side wall of the water tank 130. The limiting chamber 140 and the side wall of the water tank 130 can be detachably connected in a variety of ways, such as screw connection, buckle connection, adhesion or the like. Referring to FIG. 6 and FIG. 7, in one embodiment, the limiting plate 142 is provided with a buckling groove 143, and the side wall of the water tank 130 is provided with a limiting buckle 134 adapted to the buckling groove 143.

Further, in order to better support and fix the limiting chamber 140, a fixation member 131 is provided at the bottom of the limiting chamber 140, and a fixation hole is provided at the fixation member 131. The water tank 130 is provided with a support base 132 supporting the fixation member 131, and a fixation post 133 adapted to the fixation hole is provided at the support base 132. Specifically, the fixation post 133 may be a stud or the like.

It can be understood that, in an embodiment, in order to improve a mounting stability of the limiting chamber 140, two fixation members 131 may be provided at the bottom of the limiting chamber 140, wherein, the two fixation members 131 are symmetrically distributed on both sides of the buckling groove 143. Of course, in other embodiments one or three fixation members 131 may be provided at the bottom of the limiting chamber 140 which are not specifically limited here. A number of the support bases 132 is the same as the number of the fixation members 131 and the support bases correspond to the fixation members one to one.

On the basis of the above-mentioned embodiments, a top of the signal trigger 152 is provided with a limiting block 153, which is configured to abut against a top of the limiting chamber 140. It should be noted that the limiting block 153 is provided at the top of the signal trigger 152 to reduce a contact area between the signal trigger 152 and the limiting plate 142. Similarly, in order to reduce a contact area between the signal trigger 152 and the side wall of the water tank 130, so that the signal trigger 152 can be better raised under the action of buoyancy, a rib 154 can be provided at a periphery of the signal trigger 152. Specifically, the rib 154 can extend in a transverse direction or of course extend in a vertical direction which are not specifically limited here.

In one embodiment, in order to further increase the buoyancy of the magnetic trigger 152 and make the signal trigger 152 be raised better under the action of the buoyancy, an inside of the signal trigger 152 is hollow, and a bottom of the signal trigger 152 is provided with a water inlet hole 155 communicating with the water tank 130. In particular, the inside of the signal trigger 152 is hollow, on the one hand, a gravity of the signal trigger 152 can be reduced, and on the other hand, water in the water tank 130 enters the inside of the signal trigger 152 from the water inlet hole 155, so that the buoyancy applied to the signal trigger 152 can be increased, and the signal trigger 152 can be raised more smoothly under the action of the buoyancy.

Described above are merely optional embodiments of the present application, which do not limit the patent scope of the present application. Any equivalent structural transformation made by using the contents of the specification and drawings of the present application or any direct/indirect application in other related technical fields under the inventive concept of the present application is included in the patent protection scope of the present application.

What is claimed is:

1. A dehumidifier comprising:
   a housing;
   a water tank mounted in the housing;
   a detection device including:
      a detector arranged at the housing; and
      a signal trigger arranged in the water tank, the signal trigger including a hollow interior and a water inlet hole communicating the hollow interior and the water tank, and the whole signal trigger being configured to:
         move to a detection area of the detector in response to a water level in the water tank being higher than a preset position, and
         move out of the detection area of the detector in response to the water level in the water tank being lower than the preset position; and
   a controller electrically coupled to the detection device and configured to control a pump to stop pumping water in response to the signal trigger being located outside the detection area of the detector.

2. The dehumidifier of claim 1, wherein the detector includes a Hall sensor and the signal trigger includes a float with magnetism.

3. The dehumidifier of claim 2, wherein:
   the housing includes a partition plate;
   the partition plate and the housing together form a mounting groove;
   the water tank is mounted in the mounting groove; and
   the detector is mounted at the partition plate.

4. The dehumidifier of claim 3, wherein a lower end of the partition plate protrudes toward the water tank to form a limiting groove, and the detector is mounted in the limiting groove.

5. The dehumidifier of claim 4, wherein a bottom of the limiting groove is provided with a heat dissipation through hole.

6. The dehumidifier of claim 4, wherein an opening of the limiting groove is provided with a limiting buckle clamping a surface of the detector.

7. The dehumidifier of claim 6, wherein the limiting buckle is one of two limiting buckles provided at the opening of the limiting groove, and the two limiting buckles are arranged at opposite sides of the limiting groove, respectively.

8. The dehumidifier of claim 3, further comprising:
   a compressor;
   wherein the housing is divided by the partition plate into two chambers, one of the two chambers forming the mounting groove and the compressor being mounted in another one of the two chambers.

9. The dehumidifier of claim 3, wherein the water tank is pullable as a drawer.

10. The dehumidifier of claim 1, wherein:
a limiting chamber extending in a vertical direction is formed at a side wall of the water tank;
a communication port communicating with the water tank is formed at a bottom of the limiting chamber; and
the signal trigger is arranged in the limiting chamber and capable of moving up and down.

11. The dehumidifier of claim 10, wherein the limiting chamber is integrally formed at the side wall of the water tank.

12. The dehumidifier of claim 10, wherein the limiting chamber is detachably mounted at the side wall of the water tank.

13. The dehumidifier of claim 10, wherein a top of the limiting chamber includes a limiting plate configured to stop the signal trigger.

14. The dehumidifier of claim 13, wherein:
the limiting plate is provided with a buckling groove; and
the side wall of the water tank includes a limiting buckle adapted to the buckling groove.

15. The dehumidifier of claim 10, wherein:
a fixation member is provided at the bottom of the limiting chamber, and a fixation hole is provided at the fixation member; and
a support base supporting the fixation member is arranged at the water tank, and a fixation post adapted to the fixation hole is arranged at the supporting base.

16. The dehumidifier of claim 10, wherein a top of the signal trigger is provided with a limiting block configured to abut against a top of the limiting chamber.

17. The dehumidifier of claim 10, wherein a rib is provided at a periphery of the signal trigger.

* * * * *